United States Patent
Schoenherr et al.

(10) Patent No.: US 8,506,268 B2
(45) Date of Patent: Aug. 13, 2013

(54) LUBRICANT DOSING PUMP AND DOSING METHOD WITH TWO PISTONS MOVABLE WITH RESPECT TO ONE ANOTHER

(75) Inventors: Dieter Schoenherr, Kleinbeeren (DE); Friedrich Bauer, Berlin (DE)

(73) Assignee: Willy Vogel AG, Berlin (DE)

( * ) Notice: Subject to any disclaimer, the term of this patent is extended or adjusted under 35 U.S.C. 154(b) by 1013 days.

(21) Appl. No.: 11/838,760

(22) Filed: Aug. 14, 2007

(65) Prior Publication Data

US 2008/0044303 A1 Feb. 21, 2008

(30) Foreign Application Priority Data

Aug. 15, 2006 (DE) .............................. 102006038389

(51) Int. Cl.
*F04B 19/00* (2006.01)
*F04B 37/00* (2006.01)

(52) U.S. Cl.
USPC .......................................... 417/488; 417/375

(58) Field of Classification Search
USPC .................... 417/486, 487, 488, 375
See application file for complete search history.

(56) References Cited

U.S. PATENT DOCUMENTS

| | | | | |
|---|---|---|---|---|
| 1,689,419 A | * | 10/1928 | Bronander | 417/488 |
| 2,891,718 A | * | 6/1959 | Hall et al. | 417/246 |
| 3,302,578 A | * | 2/1967 | Anderson | 417/488 |
| 3,461,805 A | * | 8/1969 | Karkow | 417/63 |
| 3,695,788 A | * | 10/1972 | Loomans | 417/488 |
| 4,534,168 A | * | 8/1985 | Brantly | 60/369 |
| 5,024,587 A | | 6/1991 | Maurer | |
| 5,639,220 A | * | 6/1997 | Hayakawa | 417/53 |
| 2004/0265155 A1 | * | 12/2004 | Hunter | 417/488 |

FOREIGN PATENT DOCUMENTS

| | | |
|---|---|---|
| BE | 404 479 | 7/1934 |
| DE | 390 212 | 2/1924 |
| DE | 507 853 | 9/1930 |
| DE | 20 64 349 | 7/1972 |
| FR | 782 769 | 6/1935 |
| GB | 322246 | 12/1929 |
| JP | 8-72266 A | 3/1996 |

OTHER PUBLICATIONS

International Search Report dated Feb. 2, 2007 for German Application No. 102006038389.3, filed Aug. 15, 2006 (2 pages).

* cited by examiner

*Primary Examiner* — Peter J Bertheaud
(74) *Attorney, Agent, or Firm* — Fish & Richardson P.C.

(57) ABSTRACT

A method and a lubricant dosing pump for accurately dosing the small lubricant quantities. It is provided that at least two pistons are moved from an initial position relative to one another, thereby enlarging a dosing volume situated between them, and that thereby lubricant is conveyed through an inlet into the closing volume. Subsequently, the inlet is sealed and the two pistons situated opposite to each other in the stroke direction are moved together with the dosing volume until in a discharge position the dosing volume is connected with a discharge opening spaced apart from the inlet in the stroke direction. Then, the pistons are moved relative to each other, thereby reducing the dosing volume, and convey a predetermined dosing quantity of the lubricant through the discharge opening. Finally, the pistons are moved back into their initial positions.

21 Claims, 3 Drawing Sheets

LUBRICANT DOSING PUMP AND DOSING METHOD WITH TWO PISTONS MOVABLE WITH RESPECT TO ONE ANOTHER

CROSS-REFERENCE TO RELATED APPLICATIONS

This application claims priority under 35 U.S.C. §119 to German Application Serial No. 102006038389.3, filed on Aug. 15, 2006.

The invention relates to a method for dosing a lubricant as well as a lubricant dosing pump.

BACKGROUND

In the field of dosing pumps, it is problematic to accurately dose small quantities in the range of 0.5 mm$^3$ to approximately 15 mm$^3$, preferably 1 mm$^3$ to 10 mm$^3$. However, it is just the dosage of small quantities that is becoming increasingly important due to the increasingly wide-spread minimal quantity lubrication methods, such as oil-air lubrication.

SUMMARY

It is therefore an object of the invention to accurately dose small quantities of lubricant.

According to the invention, this object is achieved for the method mentioned in the beginning in that at least one piston is moved from an initial position relative to at least one other piston with enlargement of a dosing volume located between the pistons, and thereby the lubricant is conveyed through an inlet into the dosing volume, subsequently the inlet is sealed and the pistons with the dosing volume are moved towards a discharge opening, until the dosing volume is connected with the discharge opening in a discharge position, then at least one piston is moved relative to at least one other piston with reduction of the dosing volume and a predetermined dosing quantity of the lubricant is discharged through the discharge opening and finally the pistons are moved back into their initial positions.

For the lubricant dosing pump mentioned in the beginning, this object is achieved according to the invention by an embodiment in which at least two pistons disposed in a cylinder so as to be movable relative to one another and being opposed in the stroke direction, an inlet disposed in the area of a piston stroke of at least one of the pistons and ending in the cylinder, and a discharge opening spaced from the inlet in the stroke direction and ending in the cylinder which is disposed in the area of the piston stroke of at least one of the pistons, are provided, wherein a dosing volume exists between the pistons, the volume of which is variable and which can be moved from the inlet to the discharge opening.

The solution according to the invention is simple and permits a surprisingly accurate dosage of the lubricant.

The invention can be further developed by various embodiments which are each advantageous by themselves.

In one advantageous further development, for example, a particularly accurate dosage can be enabled when the dosing volume is reduced to zero during the discharge of the lubricant. This is achieved, for example, in that both pistons are moved relative to one another in the discharge position until they touch each other. Correspondingly, in the lubricant dosing pump, at least in the discharge position, the piston strokes can overlap. This embodiment permits the complete discharge of the lubricant from the dosing volume.

At least one piston can be driven hydraulically or pneumatically into at least one direction. In particular the hydraulic drive by the lubricant itself represents a simple embodiment that can be realized at low costs and can do without additional pressure lines and results in a self-sustaining, independently operating lubricant dosing pump that does not need any further energy supply from outside. The hydraulic drive of at least one piston can be effected against a spring force which is generated by at least one spring element and provides for an automatic return. In this case, the spring force can, in one embodiment, be guided over the dosing volume to the hydraulically driven piston, that means the one piston can be moved against the spring force acting on the other gap piston.

Preferably, the piston circumferential surfaces represent gap rings which can seal the pistons in particular without rubber gaskets against the piston accommodation, so that no air volumes can occur in the area of the dosing volume which would affect the dosing accuracy.

Furthermore, the piston strokes can overlap in the area between the inlet and the discharge opening. During the movement of the dosing volume into the stroke direction from the initial position into the discharge position, the inlet can preferably be sealed by the one piston situated at the inlet. During the back movement, the discharge opening is preferably sealed by the other piston situated at the discharge opening. Due to a longer stroke movement, in particular in an embodiment where the two piston circumferential surfaces are designed as gap rings, the respective sealing surfaces between the dosing volume and the respective openings are large enough for reliably avoiding leakage and thus a change of the dosing volume. Preferably, the front face of the piston sealing the discharge opening is moreover in the initial position further apart from the discharge opening than from the inlet.

The conveyance of the lubricant into the dosing volume through the inlet and/or the conveyance of the lubricant from the dosing volume through the discharge opening can be effected under the influence of hydraulic or pneumatic pressure or under the influence of a spring element on at least one piston.

In a further advantageous embodiment, the drive of at least one piston, for example during the movement from and/or to the discharge position and/or the initial position, can be effected by the other piston, for example in that the one piston is pressed against the other piston under spring force or by means of hydraulic or pneumatic pressure acting on a piston. The motive force acting on the one piston can be passed to the other piston via the lubricant contained in the dosing volume, so that the same is passively carried along. In this case, the lubricant is automatically discharged from the dosing volume through the discharge opening when the dosing volume becomes connected to the discharge opening and the motive force moves the one piston towards the other piston thereby displacing the lubricant from the dosing volume through the discharge opening. Preferably, the other piston is provided with an element, such as for example a spring element, which generates a counterforce opposed to the motive force.

The operational reliability can be increased if in the initial position and/or in the discharge position, at least one piston each is retained in an end position, that means the respective piston stroke ends in the area of the inlet and/or the discharge opening. Such an end position can be achieved, for example, if one piston has driven against a stop under a force acting on the piston.

Below, two embodiments of the invention are illustrated by way of example with reference to the drawings. The differing features in the embodiments can be arbitrarily combined according to the above explanations to give the various further developments.

DETAILED DESCRIPTION

Figures 1, 2, 3, 4:
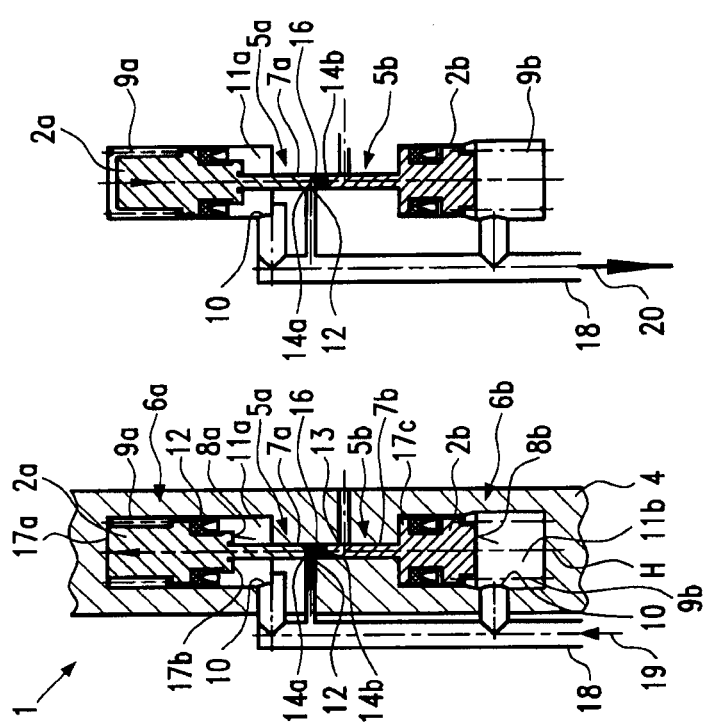
FIG. 1 shows a first embodiment of the lubricant dosing pump according to the invention in a schematic sectional view.
FIGS. 2 to 6 show other schematic sectional views of the embodiment of FIG. 1 in other operational positions.

First, the construction of a lubricant dosing pump according to the invention is illustrated by way of example with reference to the schematic sectional view of FIG. 1.

Accordingly, the lubricant dosing pump 1 comprises at least two pistons 2a, 2b which are movably disposed in a piston accommodation 4. The stroke directions H of the two pistons 2a, 2b extend in parallel or preferably coincide. The pistons 2a, 2b are situated opposite one another in the stroke direction H.

The pistons 2a, 2b each have a dosing section 5a, 5b and a control section 6a, 6b, where the control section 6a, 6b can be provided with a larger cross-sectional area than the respective dosing section 5a, 5b essentially extending transversely to the stroke direction H.

Correspondingly, the piston accommodation 4 can be provided with a smaller clear cross-section in the area of the dosing sections 5a, 5b and with a larger clear cross-section in the area of the control sections 6a, 6b, which is in each case adapted to the outer contours of these sections. The tolerances between the piston accommodation 4 and the dosing sections 5a, 5b are here preferably selected such that a gap ring 7a, 7b is formed at the circumferential surfaces between the dosing sections 5a, 5b of the pistons 2a, 2b and the piston accommodation 4 each.

At least one drive surface 8a, 8b of the pistons 2a, 2b situated at the front in the stroke direction H serves as drive surface upon which hydraulic or pneumatic pressure can act for driving the respective piston. The drive surfaces 8a, 8b are preferably disposed at the control section 6a, 6b.

Furthermore, the pistons 2a, 2b can be provided with spring elements 9a, 9b which act upon the pistons 2a, 2b each with a spring force F. In particular, the spring forces generated at each of the two pistons can act in opposite directions, so that the two pistons 2a, 2b are pressed towards each other in the non-operative state when no pressure acts on the drive surfaces 8a, 8b. At least one spring element, in FIG. 1 spring element 9a, acts against the pressure acting on the drive surfaces 8a, 8b.

The lubricant dosing pump 1 in the embodiment which is shown in FIG. 1 comprises at least one control opening 10 per piston 2a, 2b ending in a drive chamber 11a, 11b adjacent to one of the drive surfaces 8a, 8b. The drive chambers 11a, 11b and the drive surfaces 8a, 8b, respectively, are situated at the front side of the pistons 2a, 2b each opposite the spring elements 9a, 9b with respect to the stroke direction H.

An inlet 12 and a discharge opening 13 are spaced apart in the stroke direction H and end in the piston accommodation 4.

Figure 5:
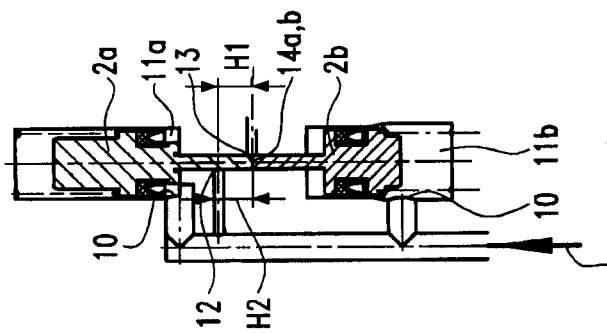

For example, the inlet 12 is disposed in a section of the piston accommodation 4 over which the front end surface 14a of the dosing section 5a of the piston 2a situated at the inlet 12 passes in the course of a stroke H1 (cf. FIG. 5). The discharge opening 13 is correspondingly disposed in an area of the piston accommodation 4 over which the front end surface 14b of the dosing section 5 of this piston 2b passes in the course of a stroke H2 (cf. FIG. 5) of the other piston 2b situated at the discharge opening. The stroke H2 of the piston 2b can end in the area of the discharge opening 13 or pass beyond the discharge opening 13 into the direction away from the other piston 2a. Equally, the stroke of the piston 2a can end in the area of the inlet 12 or pass beyond the inlet 12 into the direction away from the other piston.

A dosing volume 16 is disposed between the two pistons 2a, 2b, that is movable into the stroke direction H and has a variable size and which is connected to the inlet 12 in the initial position of FIG. 1.

Preferably at the control section 6 of each piston, stops 17a, 17b, 17c pointing into the stroke direction H or opposite to the stroke direction H and being rigidly connected to the pistons are provided which cooperate with stationary counter-stops associated to the piston accommodation and limit the stroke H1, H2 each of the pistons 2a, 2b into at least one direction. In particular, one of the pistons, in particular the piston 2a adjacent to the inlet 12, the stroke H1 can be limited in both directions by stops. This is also true for piston 2b.

Preferably, the inlet 12 as well as the control openings 10 are connected to each other and preferably with a lubricant line 18 upon which pressure acts intermittently. Thereby, a self-sustained, automatically operating lubricant pump 1 is achieved.

The discharge opening 13 can be connected to a non-depicted lubricant line, which leads to one or several neither depicted lubrication points. The inlet 12 or the lubricant line 18, respectively, can be connected to a neither depicted lubricant storage or a non-depicted lubricant feed pump.

With reference to the schematic sectional views of FIGS. 1 to 6, now the function of the embodiment of FIG. 1 is illustrated. FIGS. 1 to 6 show the same embodiment at various points of time of an operating cycle wherein the lubricant quantity contained in the dosing volume is discharged.

In the initial position which is shown in FIG. 1, pressure acts upon the lubricant in the lubricant line 18, as indicated by arrow 19. The pressure acts via the control openings 10 onto the drive surfaces 8a, 8b of the pistons 2a, 2b, so that each of them is traversed against the action of at least the one spring element 9a to their end positions situated at the inlet, and the corresponding stops 17a, 17c adjoin the counter-stops at the side of the piston accommodation. In the initial position, the front faces 14a, 14b of the dosing sections 5a, 5b are spaced apart in the stroke direction H, and the dosing volume 16 is filled with lubricant through the inlet 12. As in particular the piston 2b, which is the lower one in FIG. 1 and seals the discharge opening is designed as double diameter piston the one front face of which is formed by the dosing section 5 and the other front face of which is formed by the drive surface 8b, the pressure acting upon the front face 14b in the dosing volume 16 is not sufficient for overcoming the compressive force acting on the drive surface 8b.

By an adjustment of the stop 17c of the piston 2b sealing the discharge opening 13 towards the piston 2a or away from it, preferably from outside the lubricant dosing pump 1, the dosing volume can be easily reduced or increased.

In the next step, as represented in FIG. 2, no more pressure acts upon the lubricant line 18. This is for example the case because a lubricant feed pump not shown in FIGS. 1 to 6 which is connected to the lubricant line 18 is switched off. The lubricant line 18 is in FIG. 2, for example, connected to a lubricant reservoir.

The spring element 9a acting upon the piston 2a moves the same now from the end position towards the other piston 2b, thereby reducing the dosing volume 16. In the course of this movement, lubricant is conveyed out of the drive chamber 11a through the control opening 10 and out of the dosing volume 16 through the inlet 12 back into the lubricant line 18, as is schematically shown in FIG. 2 by arrow 20. In the course of this movement, the front face 14a of the dosing section 5a of the piston 2a passes over the inlet 12, so that the following dosing section 5a seals the inlet 14 via the gap ring 7a and prohibits a backflow of lubricant 16 through the inlet 12. This position is shown in FIG. 2. The distance between the two front faces 14a, 14b and their cross-section in the moment when the inlet 12 is sealed governs the size of the dosing volume 16.

As the spring element 9a has a stronger design than the counter-acting spring element 9b and as the lubricant in the dosing volume 16 is incompressible, the piston 2a moves, after the inlet 12 has been sealed, the piston 2b against the action of the spring element 9b associated to the piston 2b. Correspondingly, the dosing volume 16 moves, together with the movement of the two pistons 2a, 2b, into the stroke direction H towards the discharge opening 13. As the piston 2a carries the passive piston 2b along during this stroke movement, the piston 2a can also be referred to as drive piston in the embodiment of FIG. 1.

In FIG. 3, the point of time at which the front face 14b of the piston 2b situated at the discharge opening 13 is just starting to pass over the discharge opening 13 is schematically shown. Until this point of time, the discharge opening 13 was sealed by the dosing section 5b of the piston 2b. If the front face 14b passes the discharge opening 13, the same is opened and connected with the dosing volume 16. The lubricant in the dosing volume can now yield the pressure of the spring element 9a and/or the pressure of the spring element 9b by flowing through the discharge opening 13 out of the lubricant dosing pump 1, as is indicated in FIG. 4 by arrow 21.

As is furthermore shown in FIG. 4, at the end of its stroke H1, the piston 2a sealing the inlet 12 is situated in the area of the discharge opening 13, so that the same remains open. This end position ensures that all of the lubricant contained in the dosing volume 16 can be discharged. As the piston 2b discharges the lubricant out of the dosing volume with its stroke movement against the piston 2a, the piston can be referred to as dosing piston in the embodiment of FIG. 1.

In the position which is shown in FIG. 4, the front faces 14a, 14b adjoin each other and the dosing volume is reduced to zero. This position of the pistons 2a, 2b is stable if the lubricant line 18 is free from pressure, as the piston 2a is pressed by the stronger pressure spring 9a against its stop 17b facing towards the other piston 2b, and the other piston 2b with the weaker spring element 9b presses against the piston 2b, so that the piston 2a forms the stop for the piston 2b.

Figure 6:
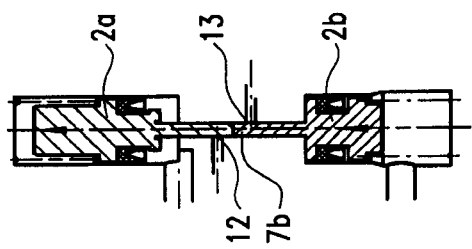

If in a next lubrication cycle the lubricant pressure in the lubricant line 18 is now built up again, as is represented in FIG. 5 by arrow 19, the lubricant pressure acts upon the drive chambers 11a and 11b via the control openings 10, and the pistons 2a, 2b are moved back from the discharge position into the initial position, wherein the front faces 14a, 14b can adjoin each other at least at the beginning of this movement. In the process, the piston 2b seals the discharge opening 13 again, as is shown in FIG. 6.

If the piston 2b reaches its end position facing the piston 2a, the piston 2a moves further, at the same time enlarging the dosing volume 16 disposed between the pistons 2a, 2b. As soon as the front face 14a of the dosing section 5a passes the inlet 12, the same is opened and lubricant is conveyed into the dosing volume 16, as is represented in FIG. 1. Consequently, the operating cycle of the lubricant dosing device 1 starts again.

By the gap ring 7b, it is avoided that due to pressure differences between the dosing volume 16 and the discharge opening 13 lubricant can flow through the discharge opening 13 and change the discharged dosing quantity. To this end, in the initial position, the front face 14b of the one piston 2b situated at the discharge opening 13 is further spaced apart from the discharge opening 13 than from the inlet 12.

In the following, the construction of the second embodiment is illustrated with reference to FIG. 7, where for the sake of shortness, only the differences to the embodiment of FIG. 1 are discussed. In the second embodiment, the same reference numerals are used as in the first embodiment, as far as the correspondingly designated elements correspond to each other with respect to construction and/or function.

Figure 7:
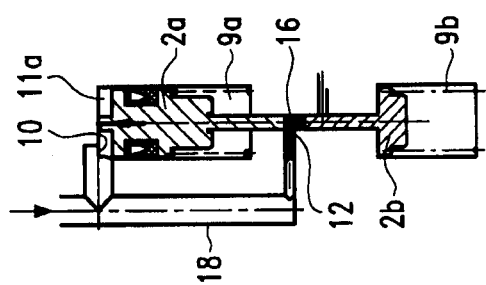
FIG. 7 shows a second embodiment of the lubricant dosing pump according to the invention in a schematic sectional view.

The embodiment of FIG. 7 has a simpler construction than the first embodiment. Only one of the pistons, in this embodiment piston 2a situated at the inlet, is driven hydraulically. Consequently, only one control opening 10 is provided. Different to the embodiment of FIG. 1, the control opening 10 moreover does not end at the side of the piston 2 facing the other piston 2b, but at its side facing away, so that by a pressure in the drive chamber 11a, the piston 2a is moved towards the piston 2b. The spring element 9a is disposed at the other side of the piston 2a with respect to the drive chamber 11a and acts against the pressure in the drive chamber 11a.

Only the spring element 9b acts upon the piston 2b and exerts a compressive force towards the other piston 2b. The compressive force is smaller than the motive force of the piston 2a generated by the lubricant pressure.

In the following, the function of the second embodiment is explained with reference to FIGS. 7 to 12, where the positions of FIGS. 7 to 12 correspond to the positions in FIGS. 1 to 6 with respect to the position of the dosing volume 16. By the different arrangement of drive chambers and spring elements, the movement of the dosing volume 1b is, however, phase-shifted with respect to the pressure build-up and reduction in the control opening 10.

Figure 8:
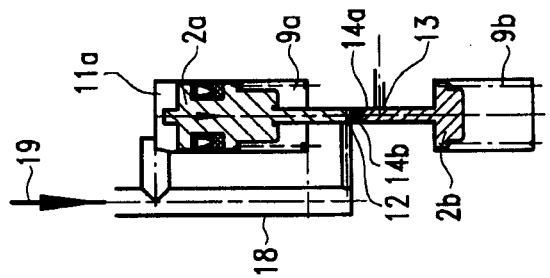
FIGS. 8 to 12 show other schematic sectional views of the embodiment of FIG. 2 in other operational positions.

In the initial position of FIG. 7, where piston 2b is in its end position moved towards the other piston 2a, and piston 2a is in its end position moved away from piston 2b, the lubricant line 18 is free from pressure. The pistons 2a, 2b are pressed against corresponding stops by the respective spring elements 9a, 9b acting on them, at the same time forming the dosing volume 16, and the dosing volume 16 is filled with lubricant. If pressure acts now upon the lubricant line 18 via a non-depicted lubrication pump at the beginning of a lubrication cycle, the same acts upon the drive chamber 11a of the piston 2a (FIG. 8). As in the first embodiment, the piston 2a moves against the action of the spring element 9a with its front face 14a over the inlet 12 and seals the same. As soon as the inlet is sealed, the piston 2b is shifted against the action of the spring element 9b by the piston 2b, so that the dosing volume 16 moves together with the pistons 2a, 2b towards the discharge opening 13.

As soon as the front face 14b of the piston 2b passes over the discharge opening 13, lubricant can flow away from the dosing volume 16 through the discharge opening 13. In its end position, the piston 2a is situated with its front face 14a in the area of the discharge opening 13 without sealing the same, so that the remaining lubricant is pressed through the discharge opening 13 (arrow 21) out of the dosing volume 16 by the action of the spring element 9b by means of the piston 2b disposed at the discharge opening 13 until the front faces 14a, 14b adjoin each other.

Figure 12:
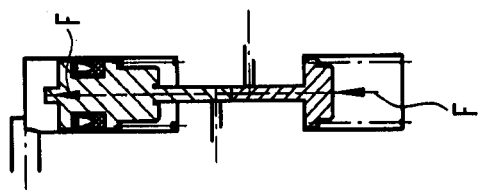
Figure 11:
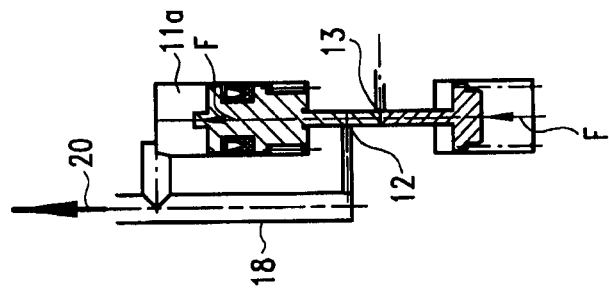
Figure 10:
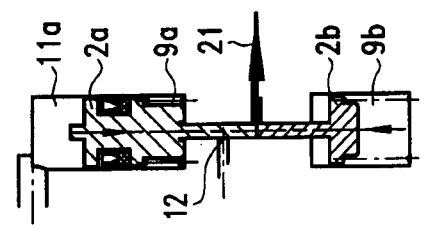
Figure 9:
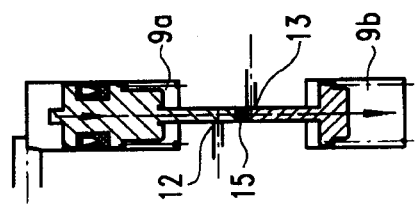

At the end of the lubrication cycle, no more pressure acts upon the lubricant line 18, and under the action of the spring elements 9a, 9b, the pistons 2a, 2b move towards the end positions associated to the initial position situated at the inlet 12, while the lubricant flows back from the drive chamber 11a through the lubricant line 18 (FIGS. 11 and 12).

If the piston 2b situated on the side of the discharge opening 13 reaches its end position at the discharge opening 13, the piston 2a is moved from the spring element 9a further into its end position remote from the other piston 2b, at the same time enlarging the dosing volume 16. In the process, as in the first embodiment, lubricant is conveyed through the inlet 12 into the dosing volume 16.

Further modifications of the above-described embodiment and the above-described functionality are possible. For example, in the different embodiments, the spring elements 9a, 9b can each be exchanged with the drive chambers 11a, 11b without basically changing the functionality in any way, only the phase relation to the pressure in the lubricant line is changed.

Furthermore, in the discharge position, the piston 2b situated at the discharge opening 13 can be moved against a stop, so that the piston 2a situated at the inlet 12 is moved against the stationary piston 2b and discharges the lubricant out of the dosing volume in this manner.

The invention claimed is:

1. Method for accurately dosing a lubricant, wherein a first piston is moved from an initial position relative to a second piston, at the same time enlarging a dosing volume situated between the first and second pistons, and thereby the lubricant is conveyed through an inlet into the dosing volume, subsequently the inlet is sealed and the first and the second pistons with the dosing volume are moved towards a discharge opening until in a discharge position the dosing volume is connected to the discharge opening, then at least one of the first and the second pistons is moved relative to the other of the first and the second pistons, at the same time reducing the dosing volume, and a predetermined dosing quantity of the lubricant is conveyed through the discharge opening, and finally the first and the second pistons are moved back into their initial positions, wherein hydraulic pressure is directly applied to a drive surface on at least one of the first and the second pistons to drive the at least one of the first and second pistons.

2. Method according to claim 1, wherein the dosing volume is reduced by moving both the first and the second pistons relative to one another until they touch each other.

3. Method according to claim 1 or 2, wherein during the movement into the initial position and/or the discharge position, one of the first and the second pistons is moved by the other of the first and the second pistons.

4. Method according to claim 1, wherein the inlet is sealed by one of the first and the second pistons during the movement into the discharge position.

5. Method according to claim 1, wherein the discharge opening is sealed by one of the first and the second pistons during the movement into the initial position.

6. Method according to claim 1, wherein the lubricant hydraulically drives the at least one of the first and the second pistons.

7. Method according to claim 6, wherein the at least one of the first and the second pistons is hydraulically driven in only one moving direction of the first and the second pistons.

8. Method according to claim 1, wherein the first and the second pistons are driven in one moving direction by at least one spring element.

9. A device comprising:
a lubricant dosing pump with two pistons disposed in a piston accommodation so as to be movable relative to one another, the two pistons lying opposite each other in a stroke direction of the pistons, with an inlet disposed in the area of a piston stroke of at least one of the two pistons and ending in the piston accommodation, with a discharge opening spaced apart from the inlet in the stroke direction and ending in the piston accommodation, which is disposed in the area of the piston stroke of at least one of the two pistons, wherein a dosing volume which is variable and which can be moved from the inlet to the discharge opening is situated between the two pistons, wherein hydraulic pressure is applied directly to a drive surface on at least one of the two pistons to drive the at least one of the two pistons.

10. The device according to claim 9, wherein strokes of the two pistons overlap in the area between the inlet and the discharge opening.

11. The device according to claim 9 or 10, wherein the piston stroke of one of the two pistons extends over the inlet and ends in the area of the piston accommodation covered by the discharge opening.

12. The device according claim 9, wherein the piston stroke of one of the two pistons extends from the discharge opening into the area of the inlet.

13. The device according to claim 9, wherein at least one spring element is provided which acts upon one of the two pistons.

14. The device according to claim 9, wherein a spring element is associated to each of the two pistons, the spring elements are disposed so as to act against each other, and the one spring element generates a greater spring force than the other spring element.

15. The device according to claim 9, wherein the dosing volume is connected with the inlet in an initial position and with the discharge opening in a discharge position spaced apart from the initial position in the stroke direction.

16. The device according to claim 9, wherein gap rings are formed at the two pistons by which the inlet and the discharge opening can be pressure-sealed.

17. The device according to claim 9, wherein:
the two pistons are disposed in drive chambers of the piston accommodation; and
the device comprises at least one control opening ending in a drive chamber allowing at least one of the two pistons to be driven hydraulically.

18. The device according to claim 17, wherein the inlet and the at least one control opening are connected to each other.

19. The device according to claim 9, wherein the lubricant dosing pump further comprises two additional pistons disposed in the piston accommodation so as to be movable relative to one another, the two additional pistons lying opposite each other in the stroke direction, with an additional inlet disposed in the area of a piston stroke of at least one of the two additional pistons and ending in the piston accommodation, with an additional discharge opening spaced apart from the additional inlet in the stroke direction and ending in the piston accommodation, which is disposed in the area of the piston stroke of at least one of the two additional pistons, wherein an additional dosing volume which is variable and which can be moved from the additional inlet to the additional discharge opening is situated between the two additional pistons, wherein at least one of the two additional pistons is driven hydraulically.

20. A method for accurately dosing a lubricant, comprising:
- moving a first piston from an initial position relative to a second piston;
- enlarging, at the same time, a dosing volume situated between the first and second pistons to convey lubricant through an inlet into the dosing volume;
- subsequently sealing the inlet and moving the first and second pistons with the dosing volume towards a discharge opening until, in a discharge position, the dosing volume is connected to the discharge opening;
- subsequently moving at least one of the first and the second pistons relative to the other of the first and the second pistons;
- reducing, at the same time, the dosing volume to convey a predetermined dosing quantity of the lubricant through the discharge opening; and
- moving the first and the second pistons back to their initial positions, wherein hydraulic pressure is applied directly to a drive surface on at least one of the first and the second pistons to drive the at least one of the first and second pistons.

21. The method of claim 20, wherein hydraulic driving of the at least one of the first and the second pistons includes filling the dosing volume with lubricant through the inlet.

* * * * *

UNITED STATES PATENT AND TRADEMARK OFFICE
CERTIFICATE OF CORRECTION

PATENT NO.         : 8,506,268 B2
APPLICATION NO.    : 11/838760
DATED              : August 13, 2013
INVENTOR(S)        : Dieter Schoenherr and Friedrich Bauer It is certified that error appears in the above-identified patent and that said Letters Patent is hereby corrected as shown below:

Title Page, column 2, item (57) Abstract, line 6, delete "closing" and insert -- dosing -- therefor.

In the Claims:

Claim 12, column 8, line 27, after "according", insert -- to --.

Signed and Sealed this
Nineteenth Day of November, 2013

Teresa Stanek Rea
*Deputy Director of the United States Patent and Trademark Office*

UNITED STATES PATENT AND TRADEMARK OFFICE
CERTIFICATE OF CORRECTION

| | | |
|---|---|---|
| PATENT NO. | : 8,506,268 B2 | Page 1 of 1 |
| APPLICATION NO. | : 11/838760 | |
| DATED | : August 13, 2013 | |
| INVENTOR(S) | : Schoenherr et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1135 days.

Signed and Sealed this
Seventeenth Day of March, 2015

Michelle K. Lee
*Director of the United States Patent and Trademark Office*